No. 880,190. PATENTED FEB. 25, 1908.
B. VON BÜLTZINGSLÖWEN.
TEA STRAINER.
APPLICATION FILED SEPT. 25, 1907.
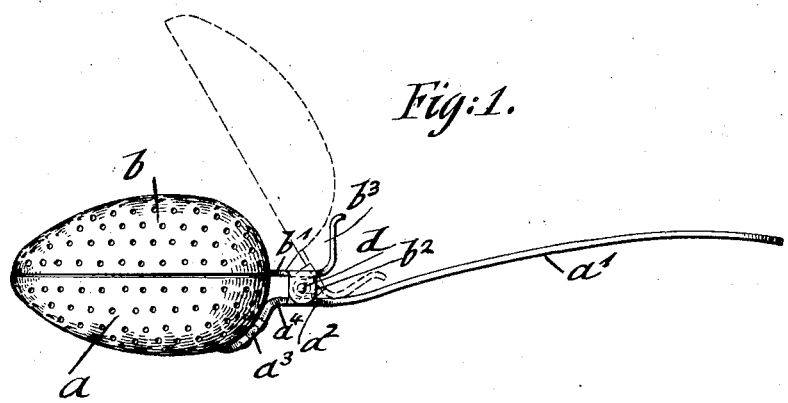
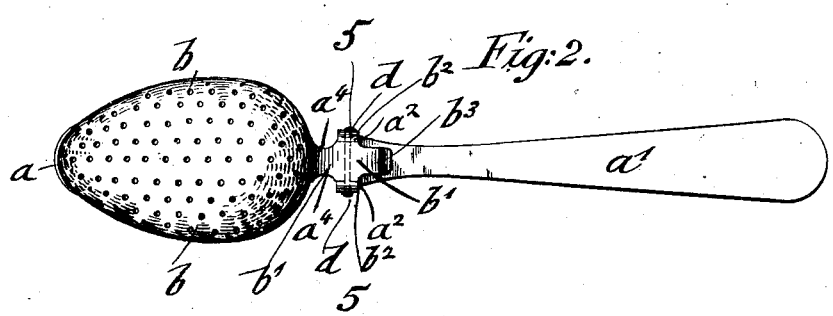
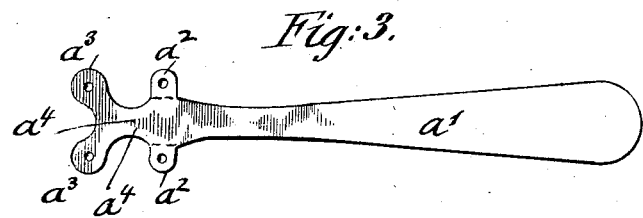
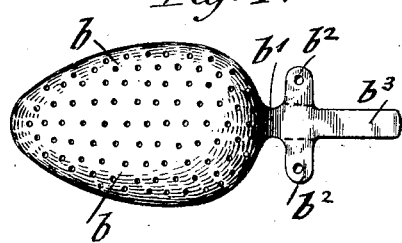
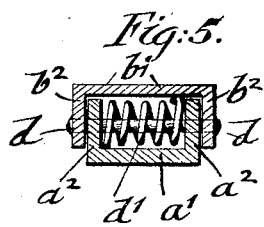
Witnesses:
Fannie Fisk
H. J. Suhrbier
Inventor
Bruno von Bültzingslöwen
By his Attorneys
Goebel & Goebel
THE NORRIS PETERS CO., WASHINGTON, D. C.

UNITED STATES PATENT OFFICE.

BRUNO VON BÜLTZINGSLÖWEN, OF NEW YORK, N. Y., ASSIGNOR TO FELIX KORNICKER, OF NEW YORK, N. Y.

TEA-STRAINER.

No. 880,190.   Specification of Letters Patent.   Patented Feb. 25, 1908.

Application filed September 25, 1907. Serial No. 394,442.

*To all whom it may concern:*

Be it known that I, BRUNO VON BÜLTZINGS-LÖWEN, a citizen of the United States, residing in New York, in the borough of the Bronx, county and State of New York, have invented certain new and useful Improvements in Tea-Strainers, of which the following is a specification.

This invention relates to an improved tea-strainer of that type which is made in the form of a spoon having a perforated bowl and a perforated cover for said bowl, so that the tea is retained between the bowl and cover while in the teapot, said strainer being conveniently filled with the required quantity of tea and the spent tea-leaves readily removed therefrom; and for this purpose the invention consists in the novel features of construction to be hereinafter described and claimed.

In the accompanying drawings, Figure 1 represents a side-elevation of my improved tea-strainer, Fig. 2 is a top-view of Fig. 1, Fig. 3 is a top-view of the blank for the spoon-handle, Fig. 4 is a detail top-view of the blank of the cover, and Fig. 5 is a detail vertical transverse section, drawn on a larger scale, on line 5, 5, Fig. 2.

Similar letters of reference indicate corresponding parts throughout the several figures.

Referring to the drawings, $a$ represents a perforated spoon-bowl which is provided with a handle $a^1$. The handle $a^1$ is made of the blank shown in Fig. 3, and provided at the end which is connected with the bowl $a$ with perforated laterally-extending integral ears $a^2$ and perforated laterally-extending lugs $a^3$, between which and the ears $a$ a contracted portion $a^4$ is formed. The lugs $a^3$ and the contracted rear-portion $a^4$ are riveted or otherwise attached to the rear-end of the perforated bowl $a$, as shown in Fig. 1. To the handle $a^1$ is pivoted near the bowl $a$ a perforated cover $b$, which is made of inverted bowl-shape corresponding to the bowl $a$, and which is provided with a short shank $b^1$ that is hinged by means of downwardly-bent perforated ears $b^2$ to the ears $a^2$ bent-up from the handle $a^1$, the pintle $d$ of the hinge-connection passing therethrough and being upset at its outer ends. The perforated cover $b$ and its shank $b^1$ are stamped by means of suitable dies in one integral piece. The end $b^3$ of the shank $b^1$, shown in Fig. 4, is bent-up so as to form a thumb-piece for the cover $b$ for opening the same when placing the tea-leaves in the bowl $a$.

On the pintle $d$ is located a helical spring $d^1$, of which one end is connected with the handle $a^1$ and the other end with the shank $b^1$ of the perforated cover $b$, so that when the cover is opened against the spring by pressing on the thumb-piece $b^3$, the spring $d^1$ is set to tension while the cover closes instantly on the bowl when the thumb-piece $b^3$ is released so as to inclose the tea-leaves placed in the same.

It will be noted that the bent-up thumb-piece $b^3$ of the shank $b^1$ will abut against the handle of the spoon-bowl when the cover is sufficiently open, so that a stop for the cover is thereby formed.

The tea-strainer can also be used for making coffee. In either case, the tea or coffee is retained in the closed bowl of the strainer. The strainer is then placed in the pot, so that the boiling water can act on the tea or coffee through the perforations in the bowls of the strainer, without any leaves or grounds being carried off with the beverage.

Having thus described my invention, I claim as new and desire to secure by Letters Patent:

A tea-strainer comprising a spoon-bowl, a handle attached to said bowl and provided adjacent the same with ears bent up at the sides of the handle integral therewith, a cover fitting over said bowl, a shank carried by said cover having downwardly-bent ears, a pintle connecting said first and last named ears, a spring interposed between said shank and said handle, and an upwardly-directed thumb-piece bent up from said shank at its rear end and which abuts against said handle and forms a stop to limit the opening movement of said cover.

In testimony, that I claim the foregoing as my invention, I have signed my name in presence of two subscribing witnesses.

BRUNO VON BÜLTZINGSLÖWEN.

Witnesses:
PAUL GOEPEL,
HENRY J. SUHRBIER.